April 11, 1939.   W. C. GROENIGER   2,154,240

COMBINED SEAT AND FLUSH-RIM

Filed Sept. 11, 1937   2 Sheets-Sheet 1

INVENTOR
William C. Groeniger
BY
Henry J. Lucke
HIS ATTORNEY

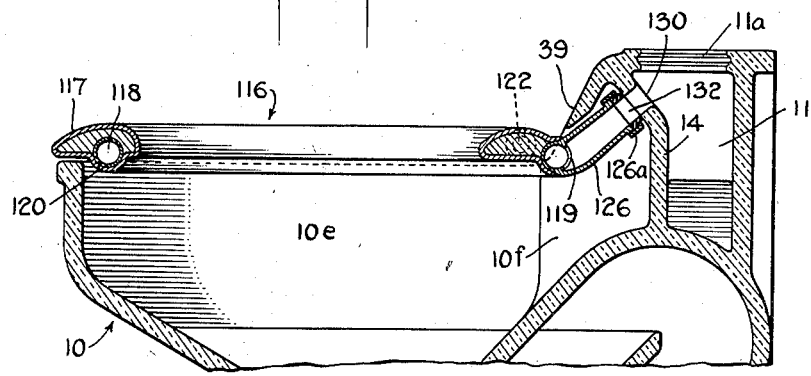
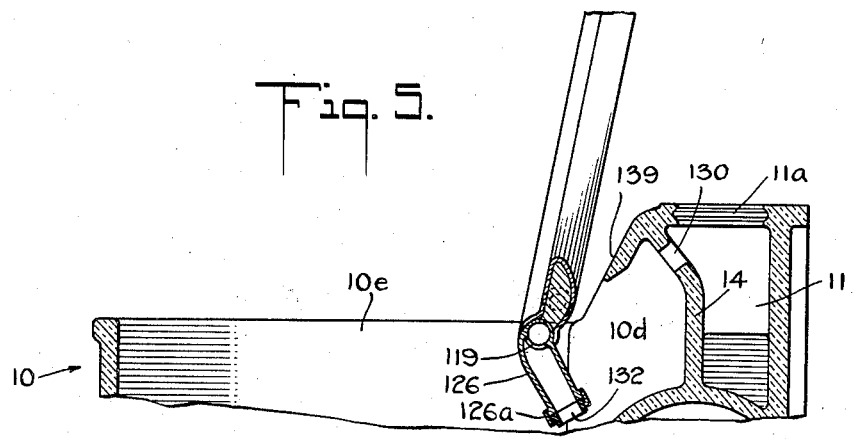
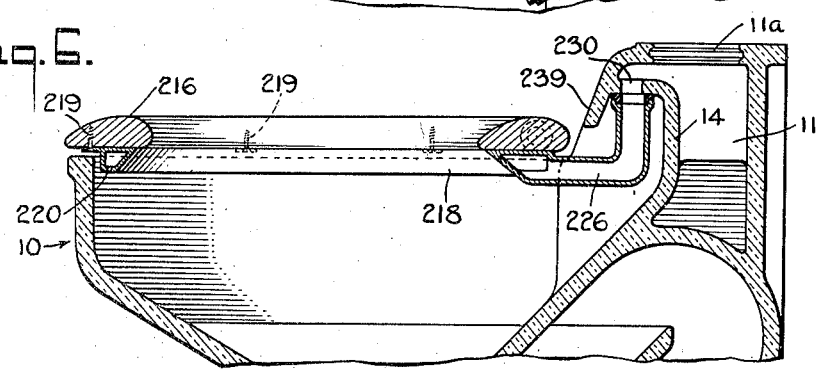

Patented Apr. 11, 1939

2,154,240

UNITED STATES PATENT OFFICE 2,154,240

COMBINED SEAT AND FLUSH RIM

William C. Groeniger, Columbus, Ohio, assignor to John B. Pierce Foundation, New York, N. Y., a corporation of New York Application September 11, 1937, Serial No. 163,382

16 Claims. (Cl. 4—98)

This invention relates to defecators.

The invention has particular relation to improvements in defecators of the type in which water or other effluent used for flushing may be introduced into the bowl of the defecator by submerged passages and/or by discharge from a supply channel or flush rim, the latter discharge commonly serving to scour the upper sides of the bowl; but the invention may be employed with any defecator in which a peripheral rim discharge or equivalent is employed to supply water or other effluent to the defecator bowl. The invention is applicable to any type of defecator bowl structure and to any desired arrangement of water supply and manner of discharge of the contents of the bowl into a soil pipe or equivalent.

Commonly, the side-scouring flushing water is discharged into the bowl through a series of ports communicating with an inner water-supplied channel formed integrally with the bowl rim. Such bowl rim or flush rim may be of vitreous china or equivalent moldable material, and provided with a series of spaced rim openings passing through the under side of the flush rim to communicate with the internal channel, and directed against the bowl to wash the inside wall thereof. Such a flush rim presents a difficult manufacturing problem, as the rim holes are formed by punching through the under side of the material forming the channel wall before such material and the therewith joined material of the bowl is fired and the glaze applied, such procedure resulting in unpredictable and uncontrollable alterations in the eventual shape, direction and effective size of the rim holes, and haphazard obstructions in the rim channel arising from the punching operation. Similar uncontrollable rim opening characteristics and irregular obstructions in the rim channel, arising from the stated rim opening forming procedure, result when cast or shaped metal is employed for defecators with which the rim channels are integral with the walls of the defecator bowls.

Water serving as the effluent discharged from rim channels integral with the defecator bowl can not be adequately controlled or regulated in volume, direction or timing relation with the flushing component or components supplied to the after-fill or liquid content of the bowl.

Further, such integral construction of rim channel and bowl proper precludes cleansing of the openings and the interior of the rim channel. Moreover, the stated obstruction in the rim channel gives rise to whistling and other noises during the stage of flushing.

Pursuant to this invention, the rim channel or flush rim is constructed mechanically independently of the bowl structure per se. Preferably, the rim channel or flush rim is mechanically directly associated with the seat. Most preferably, the flush rim is directly carried by the seat and most desirably, the flush rim and seat are mechanically formed as a unit.

Such combined seat and flush rim structure may be pivotally mounted to provide the usual movement of the same to lowered, i. e., bowl-rim supported position, and to raised position, in which latter position the flush rim structure inclusive of the seat are made wholly accessible, affording full inspection and repair if necessary, ready cleansing and sanitary treatment, and other advantages wholly unavailable in the stated types of defecators having a flush rim of integral structure with the upper rim of the bowl.

The flush rim may be of metal, or of suitable moldable material, such as "Bakelite" or other common or other suitable plastic composition, thus affording full scope of any desired arrangement of openings and definite establishment of the size and shape characteristics of jet openings to achieve control of volume, velocity, and direction of rim discharge.

The combined seat and flush means pursuant to this invention may comprise a suitable channel affixed to any conventional or other suitable type of seat, or may include a channel molded into the seat structure.

In a further embodiment of this invention, the seat may comprise a metal or other shell, suitably configurated to provide a flow-permitting channel with suitably directed and contoured orifices.

Such combined seat and flush-rim structure is suitably arranged to communicate with a source of flushing water, preferably only when in lowered position, provision being made in such preferred arrangement to break the communication upon raising the seat, and thus positively preventing the discharge of water through the flush-rim openings when the seat is in raised position.

Advantages and objectives of the invention, as set forth more fully herein, therefore include:

Simplification of manufacture of the defecator bowl per se;

Elimination of overhanging, inaccessible portions of the defecator bowl;

Simplification of manufacture of the rim opening channel per se;

Attainment of properly directed flush-rim jets;

Attainment of proper balance between rim-flush and bowl-flush components of the flushing operation; and Ready accessibility of the flush-rim means for repair, inspection, and/or cleaning or other sanitary treatment.

In the accompanying drawings:

Fig. 4 is a partial sectional elevation of a defecator bowl provided with a second embodiment of my invention;

Fig. 5 is a similar view of the embodiment of Fig. 4, illustrating the seat in raised position, with the preferred consequent break in communication between the flushing water inlet and the flush rim channel; and Fig. 6 is a partial sectional elevation of a defecator bowl provided with another embodiment of the invention.

Figure 1:
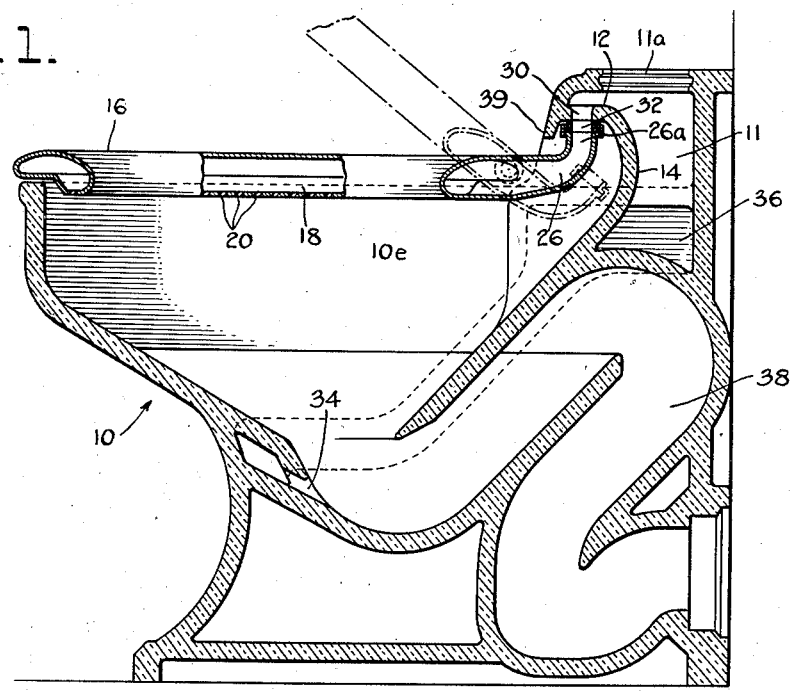
Fig. 1 is a vertical section of a defecator bowl typical of a water closet bowl, provided with combined seat and flush-rim means, pursuant to one embodiment of the invention.
Figure 2:
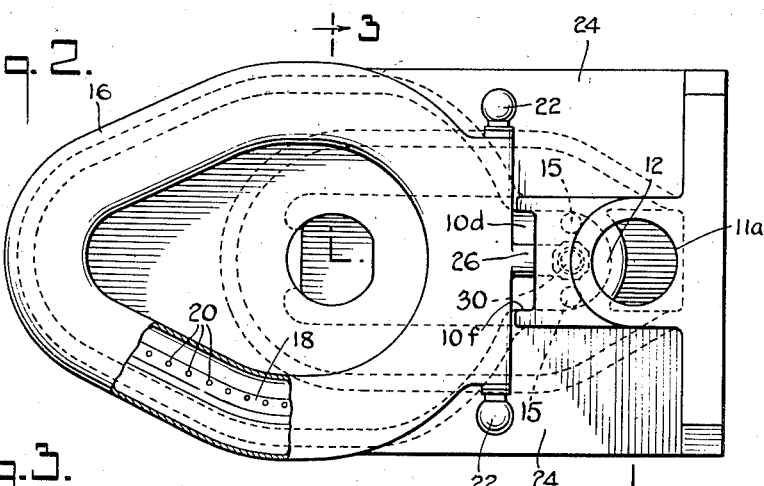
Fig. 2 is a plan view of the same.
Figure 3:
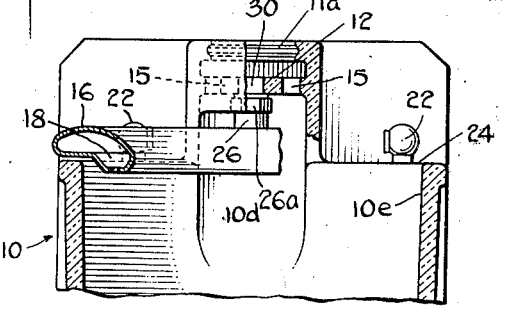
Fig. 3 is a vertical section taken on the line 3—3 of Fig. 2, illustrating the seat and flush rim means in bowl-rim-supported position.

Referring first to Figs. 1 to 3 of the drawings, the defecator bowl 10 may be of any desired form of construction and arranged for any desired manner of discharge. By "any form of construction" I include bowls of the conventional syphon wash-down type, syphon jet type, blow-out, i. e., ejector type, combined bowl and tank type, hopper type, or of the momentum jet type, the last named usually including a vortical jet opening.

Mechanically directly associated with such bowl 10, pursuant to the present invention, there is provided a water supply channel 11 having an intake opening 11a, suitably arranged for connection with a suitable source of flushing effluent, such as a flush tank, or piping equipped with a flushometer valve, etc., as preferred. As illustrated in the drawings, the water supply channel may be formed integral with the structure of the bowl proper 10.

As shown in Fig. 3, the upper portion 12 of a wall 14 serving in common as a wall of the water supply channel 11 and an upper wall portion at the rear of the bowl proper 10, may be provided with an opening or openings 15 affording communication between the interior of the water supply channel 11 and the atmosphere. Preferably, such openings 15 are disposed to direct one or more water jets in scouring relation with the inner face of such rear wall of the bowl, said openings additionally serving as air-break means for admission of atmospheric air to channel 11 in the circumstance of a vacuum or sub-atmospheric pressure condition therein, as set forth more fully and claimed in my co-pending application, Serial No. 163,383, entitled Defecator with combined flushing jet and air break, filed September 11, 1937.

Pursuant to the present invention, suitable seat means and therewith mechanically associated flush-rim means are provided, such means being suitably mounted to afford proper support for the same when the flush rim means is in position adjacent the upper rim of the closet bowl proper, under condition of flushing, to effect thorough scouring of the inner walls of the bowl proper.

In the embodiment illustrated in the Figs. 1 to 3 of the drawings, the seat means and therewith mechanically associated flush rim means are shown as a unitary structure. The seat per se 16 may be of any conventional configuration, and of suitable moldable material or of suitable metallic formation. Integrally a part of such seat 16, pursuant to the present invention, is a rim flush channel 18, of suitable volumetric capacity and contour, and provided with a desired plurality of rim openings 20 of selected volumetric capacity to afford, during the stage of flushing, jets suitably directed to scour the inner wall 10e of the bowl 10 in compliance with accepted requirements.

Suitable communication-affording means is provided between the interior of the water supply channel 11 and the interior of seat 16 serving the flush rim channel 18, during the stage of flushing, when the combined seat-flush rim means is in lowered position. Such desideratum is attained pursuant to the embodiment illustrated typically in the drawings by pivotal mounting of the combined seat-flush rim means by seat posts 22, 22, suitably secured, as to the structure of the bowl, advantageously to the indicated wall portion 24, and by a feed-pipe 26 suitably communicating at one end with the seat structure 16 as by integral wall connection therewith, the terminal opening 26a of such feed-pipe being arranged to make effective water-tight communication with the interior of the water supply channel 11 through a discharge opening 30, when the seat 16 and its therewith combined flush rim member 18 is in its lowered position. As is shown in the drawings, such communication is had by the provision of the aperture 30 in wall 12 of the water supply channel. Advantageously, the area of wall 12 immediately surrounding aperture 30 may be smoothly finished, to afford a valve-seat structure which a soft rubber or equivalent compressible gasket 32, suitably secured to feed-pipe 26 at its terminal end, may engage to effect a substantially water-tight connection.

Accordingly, under the condition of supply of water to the water supply channel 11, assuming the combined seat-flush rim means 16, 18, to be in lowered position, such flushing water is directed as follows: in part to the bowl-flushing jet or jets or equivalent, such as the jet 34 supplied through the channel 36 leading from the water supply channel 11, to effect the desired manner of discharge of the contents of the bowl as through the syphon discharge passage 38; in part through the rear jet opening or openings 15; and in part directed through the aperture 30 and thence through feed-pipe 26 to the hollow interior of the combined seat-flush rim means 16, 18, to effect bowl-scouring by discharge through the rim-jet openings 20.

It is a feature of this invention that orifice 30 and its therewith communicating seat-flush rim means may be proportioned to discharge the rim-flush water under predetermined conditions of direction, volume and pressure, thus attaining maximum scouring effect while maintaining desirable conditions of balance and non-interference between rim-flush and jet-flush operations.

Succeeding such flushing stage, assuming the combined seat-flush rim means to be brought to its raised position, any residue of the flushing water remaining in the flush rim channel 18 drains out under gravity through the now-free opening 26a.

It will be observed from Figs. 1 and 3, that a downwardly projecting ledge or wall 39, may advantageously be provided to circumvent the possibility of splashing of water from orifice 30 beyond the confines of the bowl 10. As is taught in my aforesaid co-pending application, the lower-most portion of the wall 39 should terminate substantially above the maximum overflow spill level of the defecator bowl.

In the event of operation of the flush tank, flushometer or the like when the combined seat-flush rim is in partial or fully raised position, such flushing water is discharged from the water supply channel 11 partly through the jet-discharging means 36, or equivalent, partly through the aperture 30, and jointly through the one or more openings 15, the aforesaid taking place to the exclusion of the supply of water to the interior of the combined seat-flush rim means.

Figures 4 and 5 disclose a second embodiment of the invention, in which the seat proper 116, formed of any conventional or other suitable material, is provided with an interiorly located tube or flush rim channel 118, preferably coextensive with the circumference of the seat. Advantageously, channel 118 is of metal, arranged to seat in a suitable groove formed in the seat 116, and cemented or otherwise secured thereto, and disposed in suitable adjacency to the upper side 10e of bowl 10. Preferably, a sheathing 117 of the seat proper, said sheathing commonly being employed to impart desirable color or finish to the seat, completely encompasses all exposed surfaces of the seat, including the otherwise exposed faces of the channel 118, being suitably bonded to the latter. Rim-jet discharge orifices 120 communicate with the interior of channel 118, said orifices advantageously being formed by drilling through the stated outer covering 117 and wall of channel 118, to provide suitable bowl-side scouring nozzles, properly directed and configurated to give maximum bowl scouring efficiency and desired pressure and volumetric flushing-liquid balance between the rim-flushing and bowl-flushing components of the flushing operation.

Communication may be had with the flushing water supply channel 11 through the agency of a breakable joint between a feed-pipe 126 and orifice 130 in wall 14 of the flushing water inlet channel 11. The feed-pipe may be integrally a part of hollow formation 18 or may be secured thereto as by welding or brazing, in which latter event it is brought into registry with an opening 119 of the hollow formation 118 to effect water flow.

In the manner previously described, end 126a of feed-pipe 126 may be provided with a compressible valve seat member or gasket 132, which, when the seat is in its Fig. 4 position, is effective to make a substantially water-tight connection between the orifice 130 and the said feed-pipe 126. Suitable seat-supporting hinges 122 are indicated in dotted lines in Fig. 4. Through the agency of such hinges the seat may be brought into elevated position, in which position, as shown in Fig. 5, the connection between orifice 130 and inlet pipe 126 is broken, thereby preventing discharge of flushing water through the flush rim discharge orifices 120 when the seat is in raised position. As clearly indicated in Fig. 5, any water or other flushing liquid remaining within the channel 118 at the conclusion of the normal flushing operation, may be effectively and completely drained therefrom upon elevation of the seat. Ledge 139 effectively prevents splashing of water beyond bowl 10, as described with respect to Figs. 1 and 3.

Fig. 6 discloses yet another embodiment of my invention, said embodiment comprising the application of a suitable flush rim discharge channel 218 to a conventional seat 216, as by the employ of screws or similar devices 219. Flush rim channel 218 preferably comprises a suitable hollow molded product, metallic casting or formed sheet metal structure, in which rim discharge orifices 220 are provided, either during the channel forming process or by subsequent drill operation.

Means similar to those already described, are utilized to effect a substantially water-tight connection between a supply pipe 226 of flush rim 218 and orifice 230 communicating with channel 118 and the flushing water supply channel 11. It will be understood that the stated connection may be broken on elevation of the seat, as hereinbefore described. Ledge 239 effectively prevents splashing of water beyond bowl 10, as previously described.

Means such as the conventional rubber bumpers (not shown) may be employed to support the combined seat-flush-rim means in proper relationship with the closet or defecator bowl. The depth and resiliency of the bumpers advantageously permits the weight of the seat-flush-rim means to urge the compressible gaskets or equivalent sealing means of the associated rim-flush feed-pipes into close, and thereby substantially water-sealing, relationship with the respective water supply orifices. The resiliency of the stated gaskets offer protection against undue strain, occasioned by the weight of the occupant, on the rim-flush feed pipe or its therewith associated elements.

The rim jet openings of the various embodiments may be of any desired shape or arrangement, and extend completely around the full circumference of the flush rim or any desired part thereof. For example, the stated openings may extend only to the juncture of the bowl sides 10e with the rearwardly extending chamber 10d, outlined by side walls 10f, see Fig. 2 and the said upper surface 12 of rear wall 14, thus being directed to exert full scouring effect on immediately adjacent bowl sides.

By "any desired shape" it is contemplated that the stated jets may take the form of needle-like discharges, or flat fanwise discharge. It is within the scope of this invention to provide two or more rows of jets, so directed as to provide a multi-level contact with the bowl sides.

As appears herein, this invention provides for a substantial simplification of the defecator bowl structure, by mechanically separating the rim jet flush means from the bowl structure per se. As clearly indicated in the drawings, see Fig. 3, the upper portion 10e of the bowl structure 10 may be formed with smooth sides, with complete elimination of the usual interiorly overhanging ledges or portions, the lower or inward faces of such overhanging portions being practically inaccessible, and thus forming surfaces on which bacteria or unsanitary accumulations may form. Full and complete sanitary treatment of the bowl sides and of the flush rim means pursuant to the invention is thereby made practical and simple in operation.

It is to be noted that the flush-rim discharge supply ports 30, 130 and 230 (see Figs. 1, 4, and 6) and openings 15, see Fig. 1, may advantageously be located at a distance vertically appreciably above the maximum liquid level or overflow spill level of the bowl, as set forth in my presently co-pending application Serial No. 163,383, entitled Defecator with combined flushing jet and air break, filed September 11, 1937. Such location of these ports and openings positively prevents passage of the bowl contents from the bowl into the water supply under all possible conditions of liquid level in the bowl and/or sub-atmospheric pressure, inclusive of absolute vacuum in the water supply line. The stated openings are readily accessible for cleaning or sanitary treatment.

As appears also hereinabove, the invention provides for an improved combined seat and flush rim construction, affording the utilization of more readily workable materials, particularly for the flush rim channel and its jet opening structure, as compared with present day conventional material such as porcelain, china and the like.

As appears also hereinabove, the invention provides for the safe disposal of the flushing water, under all status of position of the combined seat-flush rim structure and for the safety of the parts of the bowl, in the circumstance of shutting-off of the water distribution system in the event of freezing temperature.

Whereas, this invention has been illustrated and described with respect to a preferred embodiment thereof, it is clearly understood that changes may be made without departing from the spirit of the invention as defined in the following claims.

I claim:

1. The combination with a defecator bowl having a flushing water inlet chamber, of seat means and therewith mechanically associated rim flush means for scouring the upper surface of said bowl by direct water discharge from said rim flush means against said bowl, said seat means and said rim flush means being arranged for support on the upper surface of the said bowl and arranged for displacement away from said upper surface, said rim flush means having connection with said water inlet chamber only when the seat means is in bowl-rim-supported position.

2. The combination with a closet bowl, including a water supply compartment unitarily constructed therewith, a wall in common with such water supply compartment and the bowl proper being provided with an opening affording communication between the water supply compartment and the interior of the bowl at a locality in proximity of an inner face of the bowl proper, of seat means and associated therewith rim flush means for directing a plurality of water streams against the upper inner wall of the bowl, means for movably mounting said seat means and said rim flush means in common relative to the closet bowl to afford movement of the same from a position remote therefrom, means for limiting the movement of said rim flush means when in position adjacent the upper rim of the closet bowl, and means affording communication between the interior of said rim flush means and said water supply compartment when said seat means and rim flush means are in position adjacent the upper rim of the closet bowl.

3. The combination with a closet bowl, including a water supply compartment unitarily constructed therewith, a wall in common with such water supply compartment and the bowl proper being provided with an opening affording communication between the water supply compartment and the interior of the bowl at a locality in proximity of an inner face of the bowl proper, of seat means and mechanically associated therewith rim flush means comprising a water passage having a plurality of outlets directed against the upper interior sides of the bowl, means for movably mounting said seat means and said rim flush means in common relative to the closet bowl to afford movement of the same from a position remote therefrom, means for limiting the movement of said rim flush means when in position adjacent the upper rim of the closet bowl, and means affording communication between the interior of said rim flush means and said water supply compartment when said seat means and rim flush means are in position adjacent the upper rim of the closet bowl, said communication affording means comprising an aperture communicating with said water supply compartment.

4. The combination with a closet bowl, including a water supply compartment unitarily constructed therewith, a wall in common with such water supply compartment and the bowl proper being provided with an opening affording communication between the water supply compartment and the interior of the bowl at a locality in proximity of an inner face of the bowl proper, of seat means and means directly associated therewith for scouring the upper periphery of the bowl, means for movably mounting said seat means and said rim flush means in common relative to the closet bowl to afford movement of the same from a position remote therefrom, means for limiting the movement of said rim flush means when in position adjacent the upper rim of the closet bowl, and means affording communication between the interior of said rim flush means and said water supply compartment when said seat means and rim flush means are in position adjacent the upper rim of the closet bowl, said communication affording means comprising an aperture communicating with said water supply compartment.

5. The combination with a closet bowl, including a water supply compartment unitarily constructed therewith, a wall in common with such water supply compartment and the bowl proper being provided with an opening affording communication between the water supply compartment and the interior of the bowl at a locality in proximity of an inner face of the bowl proper, of seat means, rim flush means carried by said seat means, means affording common movement of said seat means and said rim flush means from a position adjacent the upper rim of the closet bowl to a position remote therefrom, means for limiting the common movement of said seat means and said rim flush means when in position adjacent the upper rim of the closet bowl, and means affording communication between the interior of said rim flush means and said water supply compartment when said seat means and said rim flush means are in position adjacent the upper rim of the closet bowl.

6. The combination with a closet bowl, including a water supply compartment unitarily constructed therewith, a wall in common with such water supply compartment and the bowl proper being provided with an opening affording communication between the water supply compartment and the interior of the bowl at a locality in proximity of an inner face of the bowl proper, of seat means, rim flush means integral with said seat means, means affording common movement of said seat means and said rim flush means from a position adjacent the upper rim of the closet bowl to a position remote therefrom, means for limiting the common movement of said seat means and said rim flush means when in position adjacent the upper rim of the closet bowl, and means affording communication between the interior of said rim flush means and said water supply compartment when said seat means and said rim flush means are in position adjacent the upper rim of the closet bowl, said last-named means comprising an aperture in a wall of said water supply compartment.

7. The combination with a closet bowl having a water supply chamber associated therewith, said bowl having smooth upper side walls devoid of inwardly overhanging ledges, of combined seat and rim-flush means arranged to be supported on said side walls or be swung upwardly therefrom, said seat and flush rim means including a seat structure, a water passage completely housed therein, a plurality of water discharge orifices communicating with said passages and arranged to discharge water against the inner sides of said bowl during the bowl flushing operation, and means connecting said water passage with said source of flushing water only when the seat is in bowl-rim supported position.

8. The combination with a closet bowl having a water supply chamber associated therewith, a by-pass from said chamber terminating in an orifice disposed relatively to an inner wall of said bowl, of combined seat and rim-flush means comprising a seat structure arranged to be supported on said bowl structure or to be swung into raised position away from said bowl structure, a water-receiving channel associated with said seat structure, a plurality of water discharge orifices communicating with said channel and arranged to discharge flushing water against the inner side walls of said bowl when the said seat is in bowl-rim supported position, and a feed pipe for said channel arranged to be yieldably pressed against said water-supply chamber orifice only when the seat structure is in bowl rim supported position, thereby to supply water to the rim channel coincident with bowl flushing operation under conditions whereby bowl-rim scouring can be effected by said channel orifices.

9. The combination with a closet bowl, including a flushing-water supply compartment associated therewith, of pivotally mounted seat means having formed therein means for effecting discharge of water against the upper interior sides of the closet bowl when the seat is in bowl-supported position, said means including a channel of desired volumetric content, said channel having a plurality of water-discharge orifices directed against the bowl sides, and means communicating with the flushing-water supply compartment to effect discharge of flushing water from the stated orifices during the closet-flushing operation.

10. The combination with a closet bowl, including a flushing-water supply compartment associated therewith, of a pivotally mounted seat comprising a hollow shell, a channel formed therein, a plurality of discharge orifices communicating with said channel and directed towards the upper inner periphery of the said bowl, and means connectible with the flushing water supply when the seat is in bowl-supported position for supplying water to said channel.

11. The combination with a closet bowl, including a flushing-water supply compartment associated therewith, of a pivotally mounted seat comprising a hollow shell, a channel formed therein, said channel having a wall in substantial peripheral adjacency with the upper inner wall of said bowl, discharge orifices communicating with said channel and directed towards the upper inner wall of the said bowl, and water-feeding means connectible with the flushing water supply only when the seat is in bowl-supported position.

12. The combination with a closet bowl, including a water supply compartment associated therewith, a wall of said water supply compartment provided with an opening affording communication between the water supply compartment and the interior of the bowl proper, of means mechanically separate from said closet bowl for washing the upper sides of said bowl, said means including a swingable conduit conforming substantially to the inner periphery of said bowl, said conduit having a plurality of discharge openings directed against the inner periphery of said bowl, a feed pipe for supplying said conduit, and means for effecting connection of said feed pipe with said water supply compartment opening only when the stated conduit is peripherally adjacent to said closet bowl.

13. The combination with a closet bowl, including a water supply compartment unitarily constructed therewith, of seat means, rim flush means formed as an integral part of said seat means, means affording common movement of said seat means and said rim flush means from a position adjacent the upper rim of the closet bowl to a position remote therefrom, means for limiting the common movement of said seat means and said rim flush means when in position adjacent the upper rim of the closet bowl, and means affording communication between the interior of said rim flush means and said water supply compartment when said seat means and said rim flush means are in position adjacent the upper rim of the closet bowl.

14. A seat for pivotal attachment to a closet bowl, said seat having a water flow passage mechanically associated therewith and means for connecting said water flow passage to a source of flushing water, said water flow passage having a plurality of orifices arranged to discharge water directly against the upper inner sides of the closet bowl.

15. A seat for use with a closet bowl, said seat being of hollow formation and having its undersurface provided with a series of orifices communicating with the hollow interior of said seat, said orifices being directed against the upper interior walls of the bowl when the seat is resting upon the upper surface of the bowl, said seat further having means affording connection of its said hollow interior with a source of flushing water, and hinge means for attachment to the closet bowl.

16. As an article of manufacture, a seat for a closet bowl provided with hinge means for support on said closet bowl, said seat having incorporated therein a peripheral conduit arranged to be positioned in proximity of an upper interior surface of said closet bowl, said conduit having means for connection to a source of flushing water, and having a plurality of orifices arranged to discharge flushing water against the upper inner surface of the said bowl.

WILLIAM C. GROENIGER.